United States Patent
Zhang et al.

(10) Patent No.: US 10,191,832 B2
(45) Date of Patent: Jan. 29, 2019

(54) MULTI-LANGUAGE PLAYBACK FRAMEWORK

(71) Applicant: Microsoft Technology Licensing, LLC, Redmond, WA (US)

(72) Inventors: Yu Zhang, Samammish, WA (US); Xiaohui Wang, Redmond, WA (US); Swati Gupta, Kirkland, WA (US); Michael Eatherly, Puyallup, WA (US); Chunyan Zhao, Belllingham, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 15/351,145

(22) Filed: Nov. 14, 2016

(65) Prior Publication Data

US 2018/0137025 A1  May 17, 2018

(51) Int. Cl.
G06F 9/451 (2018.01)
G06F 11/36 (2006.01)
G06F 8/38 (2018.01)

(52) U.S. Cl.
CPC ............ *G06F 11/3608* (2013.01); *G06F 8/38* (2013.01); *G06F 9/454* (2018.02); *G06F 11/3688* (2013.01)

(58) Field of Classification Search
None
See application file for complete search history.

(56) References Cited

U.S. PATENT DOCUMENTS

| | | | |
|---|---|---|---|
| 5,812,122 A | 9/1998 | Ng | |
| 7,395,456 B2 | 7/2008 | Klementiev et al. | |
| 7,653,896 B2 | 1/2010 | Herdeg, III | |
| 8,572,568 B2 | 10/2013 | Giat | |
| 8,938,383 B2 | 1/2015 | Ding et al. | |
| 9,317,413 B2 | 4/2016 | Lin | |
| 2007/0061113 A1* | 3/2007 | Ding | ............... G06F 11/3684 702/189 |

(Continued)

FOREIGN PATENT DOCUMENTS

CA          2453716          9/2008

OTHER PUBLICATIONS

Kent, "Test Automation: From Record/Playback to Frameworks", In *Proceedings of EuroSTAR*, vol. 43, Sep. 8, 2016, 17pp.

(Continued)

*Primary Examiner* — Daxin Wu
(74) *Attorney, Agent, or Firm* — Klarquist Sparkman, LLP

(57) ABSTRACT

Technology related to tools for supporting multi-language software programs is disclosed. In one example of the disclosed technology, a method can be used for testing a user interface of a software product. The method can include receiving a test recording captured using a first build of the software product targeted to a first language. A localized language file corresponding to a second language can be received. The test recording can be played back on a second build of the software product targeted to the second language. The playing back can include finding an equivalent under-test user interface element to a recorded user interface element of the test recording using a hierarchical search of properties in the localized language file. Additionally, the playing back can include performing a recorded action of the test recording on the equivalent under-test user interface element.

20 Claims, 7 Drawing Sheets

(56) References Cited

U.S. PATENT DOCUMENTS

| | | | |
|---|---|---|---|
| 2008/0295076 A1 | 11/2008 | McKain et al. | |
| 2009/0132994 A1 | 5/2009 | Doggett et al. | |
| 2009/0199096 A1 | 8/2009 | Pop-Jordanov et al. | |
| 2009/0271386 A1* | 10/2009 | Milov | G06F 9/451 |
| 2011/0016453 A1* | 1/2011 | Grechanik | G06F 11/368 717/125 |
| 2012/0131456 A1 | 5/2012 | Lin et al. | |
| 2012/0166183 A1* | 6/2012 | Suendermann | G06F 17/289 704/9 |
| 2014/0096027 A1* | 4/2014 | Ji | G06F 9/454 715/744 |
| 2014/0358889 A1* | 12/2014 | Shmiel | G06F 17/2745 707/710 |
| 2016/0103759 A1* | 4/2016 | Avery | G06F 3/0481 714/32 |

OTHER PUBLICATIONS

Korbel, "Avoiding the Temptation of Record and Playback Acceptance Tests", Published on: Sep. 10, 2013, available at: http://php.brickhost.com/blog/2013/09/10/avoiding-the-temptation-of-record-and-playback-acceptance-tests/.

Mirchandani et al., "Using IBM Rational Functional Tester to automate testing of globalized applications", Published on: Sep. 25, 2007, available at: http://www.ibm.com/developerworks/rational/library/07/0925_mirchandani-ujjwal/.

"Squish", Retrieved on: Sep. 8, 2016, available at: https://www.froglogic.com/squish/gui-testing/.

\* cited by examiner

MULTI-LANGUAGE PLAYBACK FRAMEWORK

BACKGROUND

The development of software programs can be a time-consuming and resource-intensive endeavor. In order to recoup the investment to develop a software program, it can be desirable to offer it in many markets. People in the different markets may speak different languages and so it can be desirable for the software program to support different languages. Development tools for software programs can be used to reduce the time to market and to provide higher-quality software programs with increased functionality and decreased faults.

SUMMARY

Technology related to multi-language support for software programs is disclosed. In one example of the disclosed technology, a method can be used to test a user interface of a software product. The method can include receiving a test recording including multiple recorded actions performed on respective user interface elements of the software product. For example, the test recording can be captured on a first build of the software product targeted to a first language. The method can include receiving a localized language file corresponding to a second language different than the first language. The localized language file can associate the user interface elements with multiple properties. The method can include playing back the test recording on a second build of the software product targeted to the second language. For example, the playing back can include finding an equivalent under-test user interface element to a recorded user interface element of the test recording using a hierarchical search of the multiple properties provided by the localized language file. Additionally, the playing back can include performing a given recorded action, among the multiple recorded actions of the test recording, to the equivalent under-test user interface element.

DETAILED DESCRIPTION

General Considerations

Figure 1:
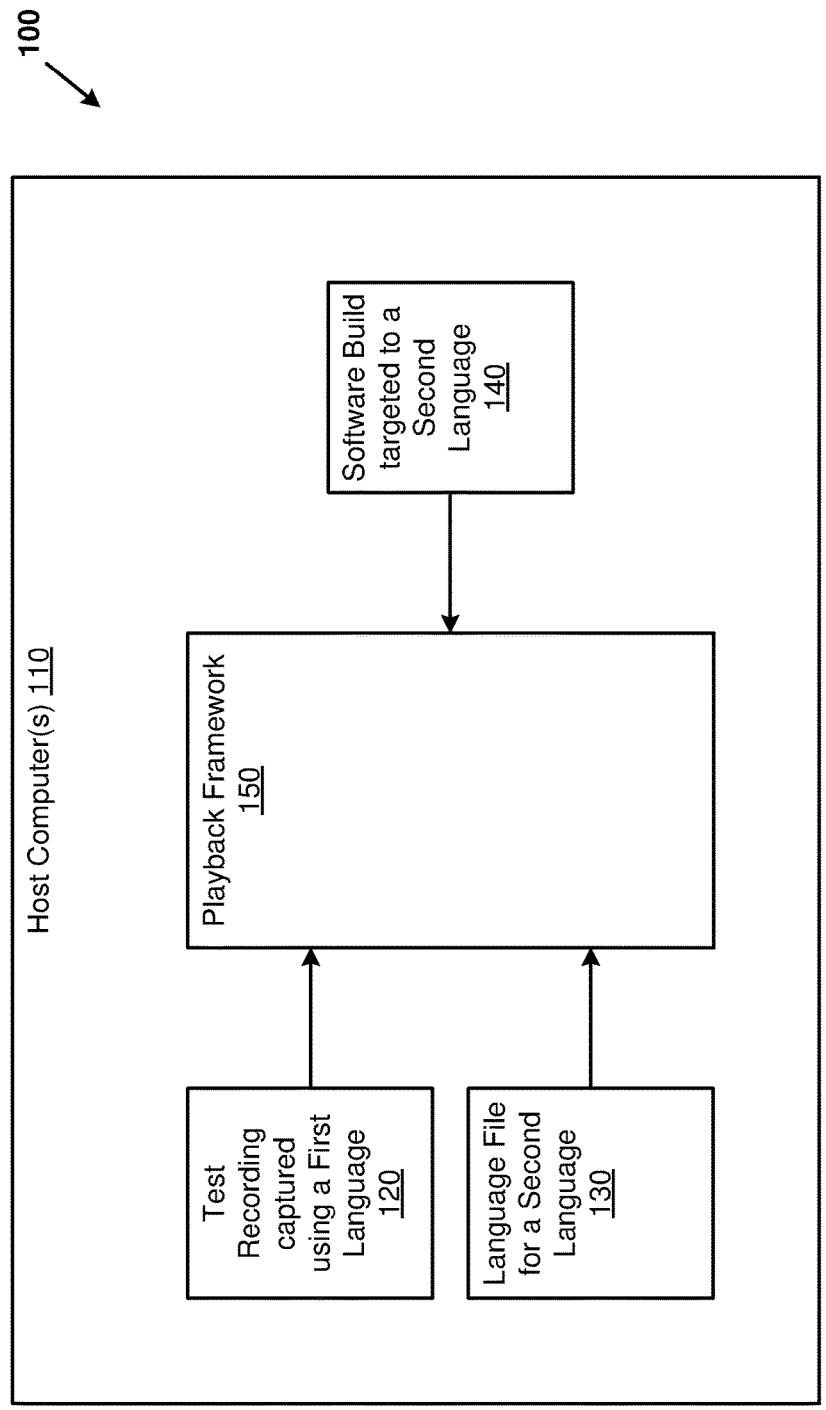
FIG. 1 is a system diagram of an example of a playback framework having multi-language support.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Overview

Development tools for software programs can be used to reduce time to market and to provide higher-quality software programs with increased functionality and decreased faults. One example of a development tool is a recording tool that monitors and captures a user's input when a software program is executing. The software program can be an application, a library, or any other type of software. For example, the software program can have a user interface that presents information to the user and accepts input from the user. Specifically, the user can manipulate user interface elements or controls, such as by moving a cursor controlled by a mouse and selecting items by clicking a button on the mouse. The recording tool can capture these actions and the affected control elements. The recording tool can also capture output at a verification point during execution of the program. For example, an output, such as data presented in a window, can be recorded in response to the user performing an action on a user interface control. The captured inputs and outputs can be recorded in a record file or a recording file. Additionally or alternatively, a developer can write a script that can be used to manipulate the user interface controls in a predetermined manner and can specify an expected output or result at predetermined points of execution of the software program.

The record file or the script (generally, "record file") can be used by another development tool, such as a playback framework for executing the software program and applying the actions specified by the record file to the user interface elements. Additionally, the playback framework can compare outputs or results specified by the record file with the outputs or results generated by the software program when the record file is played back using the software program. The playback framework can indicate a successful run when all of the outputs generated by the software program match the expected results from the record file when the inputs specified by the record file are applied during the execution of the software program. In contrast, the playback framework can indicate a failing run when at least one of the outputs generated by the software program do not match the expected results from the record file when the inputs specified by the record file are applied during the execution of the software program. Thus, the playback framework can be used to test the software program as changes are made to the software program. For example, a developer can execute the software program and store the inputs and outputs of the run in a record file, the developer can make changes to the software program, and the developer can play back the record file on the modified software program to determine whether any of the modifications affected the output when the inputs from the record file are repeated. Thus, the record file can be used to test the software program as the program is developed. Different tests corresponding to different record files can be generated and combined into a regression suite. The regression suite can be executed at different milestones of the development (such as a product release or a code commit) to verify whether the software program is performing as intended.

Software programs can be designed to support many different languages. The functions of a software program can be divided into different components, such as modules, procedures, objects, and/or classes. The different components can make up a code base for the software program. The different components can be custom designed by one or more developers and/or made of libraries provided by third parties. As a specific example, one set of components can provide the functionality for the user interface of the software program. The set of user interface components can be designed to support multiple languages. As an example, a parameter or variable passed to the components can determine which language is presented and accepted by the user interface. As another example, a set of user interface components can support a single language, and multiple languages can be supported by using different components for different versions of the software program. Thus, one set of components can be used to create a software program supporting English, and a different set of components can be used to create a software program supporting a different language, such as French, German, Korean, Hindi, or Mandarin.

A software build can be generated to customize a software product for a particular language. A make file or similar script can be used to compile and link software components (such as source code and/or object code) so that an executable software program can be created with a desired set of properties. For example, the make file can define which components from a code base are used and/or define compiler directives that can be used to control how a component functions when it is compiled into an executable. Different builds of an executable software product can be produced from a common code base by using different make files and/or a parameterized make file. For example, a first build of the software product can be targeted to a first language (e.g., English), and a second build of the software product can be targeted to a second language (e.g., Mandarin). It can be desirable to test different builds of the software program with the same record file to potentially provide higher-quality software programs with increased functionality and decreased faults. For example, a regression suite including multiple record files can be generated for a software build targeted to one language, and the record files of the regression suite can be applied to software builds targeting different languages. Thus, a human tester knowing only one or a few languages can potentially launch the regression suite to test multiple different software products using different languages. The number of languages required to be known by the human running the regression suite can be reduced, and the amount of resources to create the software products can be reduced.

A potential barrier to using the same record file for software products in different languages can be consistently identifying the user interface elements in the different languages. For example, record files can identify a user interface element using a position of the user interface element or using a text string associated with or displayed within the user interface element.

One format of record file can record a location within an output screen (such as one shown on a computer monitor or display) where an action occurs. For example, picture elements (pixels) of the screen can be assigned coordinate pair values based on the location of the pixels on the screen. As a specific example, an origin on the screen (e.g., location (0,0)) can be located in the lower-left of the screen, as typically viewed by a user, and an x-coordinate can increase as pixels are located farther to the right of the origin, and a y-coordinate can increase as pixels are located farther up from the origin. The record file can include an entry or command specifying that the mouse cursor moves from a first location on the screen (e.g., (50, 100)) to another location on the screen (e.g., (340, 312)). The record file can include an entry that a left mouse button is clicked when the mouse cursor is located at a particular location on the screen, such as the last location of the cursor. Example pseudocode for the entries can be:

Cursor (50, 100) to (340, 312);
Left-click;

On the one hand, using screen coordinates to specify where actions occur can be language independent because the action is not identified with a word of the language. On the other hand, the amount of space used or the orientation on the screen can be different when communicating the same information in a different language. In particular, the size of a user interface element can be based on a length of word(s) displayed within the element, and the relative orientation of the user interface elements can be based on how the language is written. For example, some languages can be written vertically, some can be written left-to-right, and some can be written right-to-left. Thus, an arrangement of the user interface elements can be horizontal or vertical. As another example, the English word "cancel" is more compact than the equivalent German word "abbrechen," and the English word "save" is more compact than the equivalent German word "speichem." The conjugation of verbs can also change the placement of words within a phrase and can change the length of a phrase. User interface elements may be placed relative to one another based on a length of words or phrases within the elements and/or based on the orientation of the language. Thus, user interface elements in English may be more compact than user interface elements in German, since English words tend to be shorter than German words. Additionally, some user interface elements can be sized and/or placed based on a previous use of the element or a user's preferences. For example, a first window can placed in a first location on a screen, and a second window can be placed relative to the first window. In this scenario, the location of a user interface element can depend on programs that are run prior to the record file being played back. Thus, a record file that only records a position of a mouse cursor when an action occurs may fail when played back at different times and/or on different builds of the software product targeted to different languages, because user interface elements can move to different locations on the screen for the different builds.

Continuing with the example above, left-clicking at location (340, 312) may result in a user interface element being selected when the record file is recorded. However, the user interface element can be located in a different position during a different run of the software program or for a different build of the software program. If the user interface element does not overlap with the location (340, 312) during a different run, then the program will behave differently than when it was recorded.

Another format for the record file can identify user interface elements by a name or by another identifier. For example, an entry or other statement of the record file can indicate that a "cancel" button was selected. However, using a name identifier can introduce a dependency on the language used to create the record file. In one solution, the playback framework can translate between different languages. For example, the playback framework can translate the "cancel" button recorded on an English build of the software program to an "abbrechen" button on the German build of the software program. However, a basic translation of the user interface elements may not work in every case because some text strings may change between runs of a program (such as when a user name or a date field is part of the text string) or there may be multiple user interface elements that match the text string. For example, some programs, such as operating systems, can potentially have complex user interfaces with multiple user interface elements that overlap or that share many of the same characteristics. Thus, a playback framework that uses only a translation of named identifiers or a position of a user interface element can potentially fail when a record file is played back at different times and/or for different software builds.

As described herein, a playback framework can use a hierarchical search of properties of user interface elements to find equivalencies between the user interface elements of the record file and the user interface elements of a build of the software program being executed. Specifically, the hierarchical search can include an algorithm for retrieving a target user interface element using one or more properties of a source user interface element. For example, the source user interface element can be a user interface element specified by the record file, and the target user interface element can be a user interface element of the build of the software program being executed. As another example, the source user interface element can be a user interface element of the build of the software program being executed, and the target user interface element can be a user interface element specified by the record file. The hierarchical search can search for the target user interface element by evaluating types of properties in a predefined order, which ranks or prioritizes some types of properties ahead of other types of properties in logic of the hierarchical search. For example, more reliable properties for identifying a user interface element can be evaluated to identify the target user interface element before evaluating less reliable properties for identifying the target user interface element. If one type of property fails to uniquely match a target user interface element, then a different type of property can be used to uniquely match the target user interface element. For example, a type of property can fail to uniquely match the target user interface element because there may be no elements matching the property or there may be multiple elements matching the property. Additionally, probabilistic or partial matches can be used to identify the target user interface element. In this manner, a playback framework applying a test script or other record file to a given software build running at different times or on different software builds can potentially produce more reliable results compared to using location-based matching and/or basic translation matching. Thus, the playback framework can enable faster and more thorough testing, resulting in higher-quality software and/or software that goes to market sooner.

FIG. 1 is a system diagram of an example system 100 including a playback framework 150 having multi-language support. The playback framework 150 can enable a test recording 120 captured using a software build targeted to a first language to be played back on a software build 140 that is targeted to a second language. The playback framework 150 can include hardware and/or software executing on one or more host computers 110. For example, the host computer 110 can include a processor, memory, and storage. The memory and/or storage can be used to store a test recording 120, a language file 130, and instructions for executing the software build 140 and the playback framework 150.

The test recording 120 can be based on information that is captured when executing a software product targeted to a first language. In particular, the test recording 120 can include a plurality of actions to perform on respective user interface elements of the software product. For example, the test recording 120 can include an ordered set of statements or entries (generally, "statements"). A respective statement can indicate an action to perform on a user interface element. Depending on implementation, the action can be any of various types of user input events, whether specified at a low level (e.g., mouse button click, cursor move, keystroke) or specified at a higher level (e.g., actuation of a button, toggling of a control, change of a slider, selection of a menu item). The statement can include one or more fields to specify the particular action and the user interface element affected by the action. For example, the statement can include fields for identifying the affected user interface element by an automation identifier, a class name, a class type, a user interface tree, a position, and/or other identifiers. The identifying fields can include language-specific fields, such as a text string captured in the first language. The identifying fields can include language-neutral fields, such as the automation identifier, the class name, the class type, or the user interface tree.

The particular fields used to describe a given user interface element can be based on how the user interface element is programmed and/or on the capabilities of the capturing tool. As an example, a functional specification for the software program can advise developers to provide capabilities and/or interfaces to generate specific properties for a user interface element, such as an automation identifier when the user interface element is created. However, the programmer may omit the capability, and so the user interface element can only be identified using different properties, such as a location of the element or a text string displayed within the display area of the user interface element. The software program may be highly compatible with the capturing tool, so that more distinguishing information (like automation identifiers) can be captured from the user interface elements. Alternatively, the software program may be less compatible with the capturing tool, so that less distinguishing information (like text-strings displayed on the elements) can be captured from the user interface elements.

The test recording 120 can include statements used to verify outputs of the software product. For example, a statement can be used to verify that a user interface element is displayed in response to an action being performed from an earlier statement. As another example, a statement can be used to verify that a particular text string is displayed within a display area of a user interface element. The test recording 120 can include statements used to pause or wait for a specified amount of time. Additionally, the test recording 120 can include programming statements that change a state or flow of the test recording 120. For example, the test recording 120 can be edited by a programmer or developer to modify and/or add functionality specified by the test recording 120. As specific examples, the test recording 120 can include statements for: declaring and assigning variables, evaluating numeric or conditional expressions, changing a control flow of the test recording 120, generating an output, and other various operations.

The language file 130 can be used to associate user interface elements of the software program with various different properties. As one example, the language file 130 can map one or more properties of user interface elements specified in the test recording to user interface elements of the software build 140 that is targeted to the second language. In particular, the language file can include a data structure that lists values of one or more properties that are associated with a respected user interface element used by the software build 140. A value of a property can be used as a key to return one or more matching user interface elements. The language file 130 can map language-neutral or language-specific properties of user interface elements specified in the test recording to user interface elements of the software build 140. As a specific example, the language file 130 can include an element that is associated with the automation identifier of 1001. A search of the language file 130 using a value of 1001 for the automation identifier property can return the target user interface element of the software build 140. As another specific example, the language file 130 can include multiple elements associated with the English text string "cancel." A search of the language file 130 using a value of "cancel" for the English text string property can return all of the user interface elements of the software build 140 with the matching property. Example pseudocode of a statement of the language file 130 for a cancel button can be:

---

<element className="CancelButton" classType="button" autoID=1001
EnglishText="Cancel" GermanText="abbrechen"
UITree="root205/Window210/Button216" origin=(300, 250) extent=(450, 350) \>

---

The software build 140 can be targeted to a second language that is different than the first language that is used to capture the test recording 120. For example, the software build 140 can be compiled to create an executable where user interface elements present and accept information in only the second language. As another example, the software build 140 can include an executable that supports multiple languages and can be customized using a configuration file, a command line parameter, or a setting so that the user interface elements present and accept information in the second language. The software build 140 can include source code, object code, executable code, resource files, and/or other files for enabling the software product to display and capture information in the second language.

The playback framework 150 can enable the test recording 120 to be played back on the software build 140. As one example, the playback framework 150 can emulate or simulate running the software build 140 on particular hardware. For example, the playback framework 150 can include a virtual machine and the instructions of the software build 140 can be executed by the virtual machine. The inputs and/or outputs provided to the software build 140 can be based on the test recording 120. As another example, the playback framework 150 can include an integrated development environment (IDE) and the instructions of the software build 140 can be interpreted and/or executed by the IDE. As another example, the playback framework 150 can include or interface to an accessibility framework for providing programmatic access to the user interface elements of the software build 140. The accessibility framework can include user- or kernel-level routines integrated within an operating system that can be accessed using one or more predefined application programming interfaces (APIs). In particular, statements of the test recording 120 can be used to generate input for an input stimulus routine of the accessibility framework. The input stimulus routine can enable an input (such as moving a mouse cursor or clicking a button of the mouse) to be programmatically generated and used by the software build 140 while it is executing. The accessibility framework can include output capture routines, such as a screen reader to capture information output or displayed by the software build 140 while it is executing. The captured information from the screen reader can be used to verify whether the user interface is producing outputs that match the outputs recorded or specified by the test recording 120.

It should be noted that the user interface elements described in the test recording 120 can be the same or different from the user interface elements of the software build 140. As one example, the user interface elements can support multiple languages, and the code base specifying the user interface elements can be used to create both the software build used to generate the test recording 120 and the software build 140. In this case, a given user interface element can have properties corresponding to multiple languages, such as an English text string, a German text string, and so forth. Thus, the user interface element captured by the test recording 120 can be a different instance of the same user interface element used by the software build 140. As another example, the user interface elements can support a single language, and so different code is used to create the user interface elements of the software build used to generate the test recording 120 and the user interface elements of the software build 140.

Actions performed on user interface elements and captured by the test recording 120 can be translated by the playback framework 150 into actions to perform on user interface elements of the software build 140. In particular, the playback framework 150 can parse statements of the test recording 120 to determine a recorded user interface element and a recorded action to perform on the recorded user interface element. The recorded user interface element can be specified using one or more language-neutral or language-specific properties. Using the language file 130, the playback framework 150 can find an equivalent under-test user interface element (e.g., a user interface element of the software build 140) to the recorded user interface element using a hierarchical search of the language file 130. Specifically, the hierarchical search can include an ordered search to find one or more under-test user interface elements having one or more properties that are associated with the one or more properties of the recorded user interface element. The properties searched can include an automation identifier, a text string, a path identifier, and/or a location of a user interface element, for example. As one example, the hierarchical search can include searching for an automation identifier property prior to searching for a text string and searching for a text string prior to searching for a path identifier. The search for a text string can include performing a probabilistic search of a text string property. Additional details of examples of hierarchical search are described further below, such as with reference to FIG. 4. The hierarchical search can return a user interface element of the software build 140 that is associated with the recorded user interface element.

The playback framework 150 can perform the recorded action on the user interface element returned by the hierarchical search. For example, the recorded action can be programmatically generated and used as an input into an input stimulus routine of an accessibility framework. As specific examples, the input can cause a mouse cursor to be moved, a user interface element to be selected, a section of text to be highlighted, alphanumeric characters to be entered, and so forth.

Example User Interface

Figure 2:
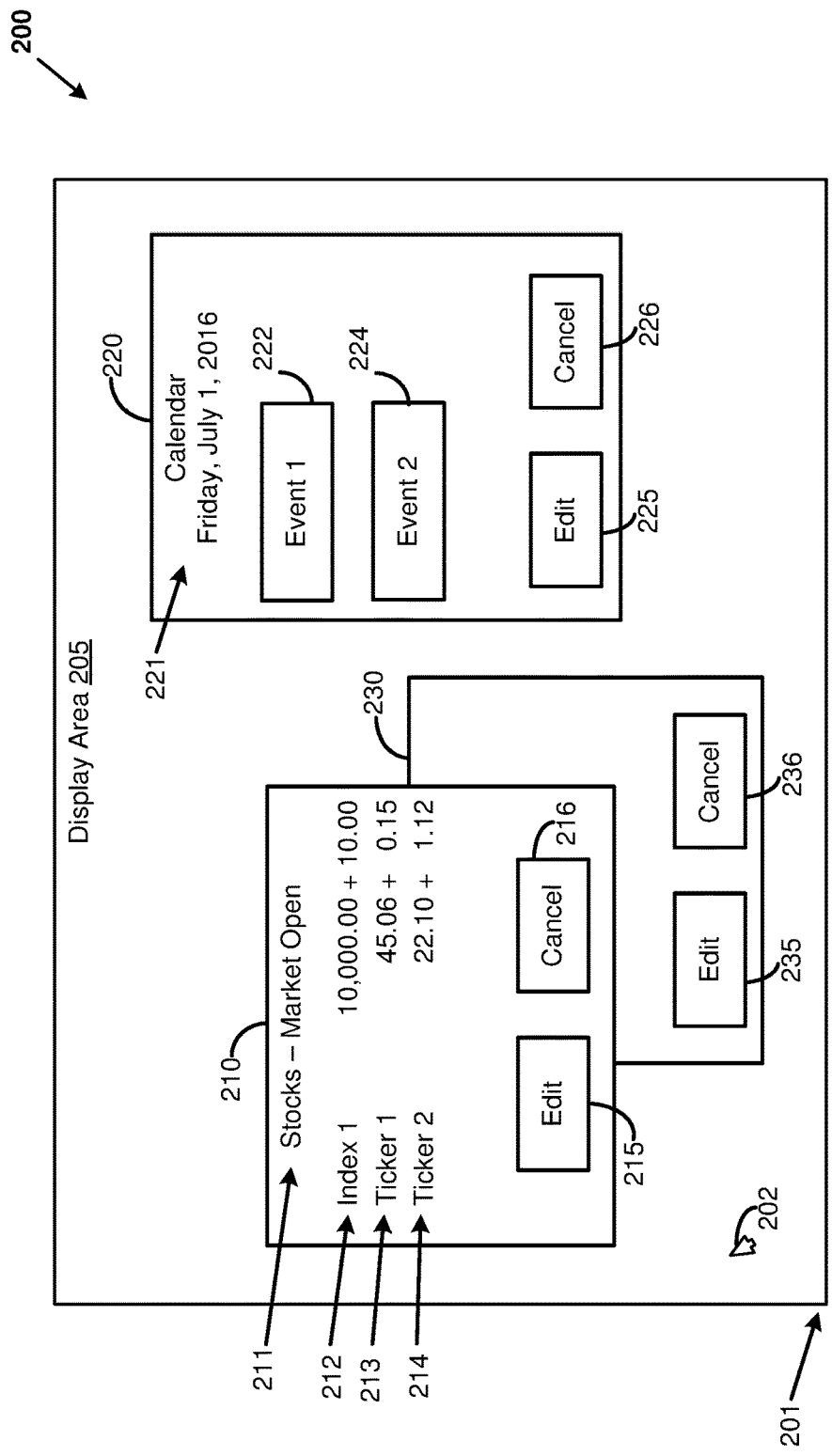
FIG. 2 illustrates an example of a user interface of a software program.

FIG. 2 illustrates an example of a user interface 200 of a software program, such as an operating system. The user interface 200 can include display area 205 where information and user interface elements can be displayed. For example, the display area 205 can be an area within a web browser, an area within a screen, or an area within a page of the software program. The information and the user interface elements can be displayed at different locations with the display area 205. The locations can be specified using a coordinate system where an origin is located at location 201. A user interface element can include a feature of the software program that can be seen, heard, or otherwise perceived or interacted with by a user. For example, the user interface elements can include windows, title bars, cursors, icons, buttons, dialog boxes, edit boxes, list boxes, combo boxes, scroll bars, pick lists, pushbuttons, radio buttons, carousels, links, hyperlinks, images, chimes, sounds, and so forth. A given user interface element can include a single element or multiple elements that are combined into a larger unit. As one example, a toolbar item can include a list element, a combo box element, a scroll bar element, and so forth. As another example, a window item can include a title bar element, a button element, a scroll bar element, a link or hyperlink, a text string, and so forth. The user interface elements can be nested in a hierarchy so that more basic elements can be used to create more complicated composite elements. Additionally, the different user interface elements rendered by the program can change as user interface elements are added and removed due to the progression of the program.

A hierarchy of the user interface elements can be described using a user interface tree. For example, the hierarchy can begin with a root element which can represent a starting screen or main screen of a software program. For example, the root node can be a desktop of an operating system or a start screen of an application program. Descendent elements (e.g., children, grandchildren, and so forth) can be displayed within the root element. For example, a child element of a desktop can be an application window. The application windows can have children elements representing components of the respective windows such as title bars, scroll bars, menus, buttons, toolbars, and list boxes, for example. The user interface tree can be adapted as the software program executes. Specifically, nodes can be added to the tree when new user interface elements are displayed, and nodes can be removed when user interface elements are removed from the display. A position of a particular user interface element within the user interface tree can be described with a user interface path in a hierarchy. For example, a user interface element two levels from the root node can be described with a path like "root/parent/child element." While general names are used in this example, the user interface elements can be given unique identifiers when they are created so that they can be uniquely identified within the user interface tree.

Users can interact with the software program by performing actions to the user interface elements. For example, the actions can include clicking or selecting, highlighting, dragging, sliding, accessing, entering text, speaking into a microphone, and other actions designed to provide an input to the software program. As one example, a user can interact with a user interface element by maneuvering a cursor (such as cursor 202) on the screen (typically controlled by a mouse or keyboard) and pressing or clicking buttons while the cursor is positioned over or is pointing to the user interface element. Based on the input from the mouse or keyboard, the computer can add, change, and/or manipulate what is displayed on the screen. Alternatively, a record file (e.g., test script) can be used to programmatically perform actions on the user interface elements, such as by using an accessibility framework of the operating system.

As a specific example of a user interface, the user interface 200 includes a desktop or display area 205 and three different windows 210, 220, and 230. In this example, the user interface 200 is generated using a software build directed to the English language, and the user interface elements are displayed in English. In a different run, the user interface can be generated using a software build directed to a different language, such as German, and the user interface elements can be displayed in German. The window 210 overlaps the window 230 and the window 220 is non-overlapping with the windows 210 and 230. The window 210 includes a title bar 211 labelled "Stocks—Market Open," three links 212-214, and two buttons 215 and 216. The window 210 can be used by a user to access program functions related to displaying information about a stock market. For example, the title bar 211 can indicate a status of the stock market (such as whether the stock market is currently open or closed), and the links 212-214 can display a real-time or time-delayed price for various stock indices and/or company stocks. When the cursor 202 is moved over one of the links 212-214 and a left mouse-button is clicked (this can be referred to as clicking the link), a different window (not shown) can appear which displays additional information associated with the company or index associated with the link. The window 210 includes two buttons, specifically an edit button 215 and a cancel button 216. For example, when the cursor 202 is moved over the button 215 and a left mouse-button is clicked (this can be referred to as clicking the button or left-clicking the button), a text box user interface element (not shown) can be created for the user to enter a ticker symbol from the keyboard. As another example, when the cancel button 216 is clicked, the window 210 can be removed from the display area 205 which can expose the full window 230. The cancel button 216 can have a user interface path such as "desktop/stocks—market open/cancel," "desktop/stock program opening screen/cancel button," or "root205/Window210/Button216," for example.

The user interface 200 can include multiple user interface elements that share similar properties. For example, the window 230 includes an edit button 235 and a cancel button 236 which can perform similar tasks to the edit button 215 and the cancel button 216 of window 210. Similarly, the window 220 includes an edit button 225 and a cancel button 226 (in addition to a title bar 221 and two additional buttons 222 and 224). As one example, the different cancel buttons 216, 226, and 236 can have some of the same property values, such as a class name (e.g., cancelButton), a class type (e.g., button), or text string (e.g., "cancel"). A playback framework can potentially distinguish the different cancel buttons 216, 226, and 236 from each other using property values that differ, such as an automation identifier, a location of the button, an instance name, or a user interface path.

For example, a software program designed to work with an accessibility framework can generate a unique automation identifier value for each instance of a user interface element, and the automation identifier value can be passed to the accessibility framework when the instance of the user interface element is acted on. In object-oriented programming, a class can be used to define the functionality of a type of object (e.g., a type of user interface element), and an instance (e.g., a particular user interface element) of the class can be generated at runtime when the object is created. As a specific example, a counter can be incremented each time an instance of a user interface element is created and the value of the counter can be assigned to an automation identifier property for the newly created instance. In this manner, the automation identifier property for each of the different user interface elements can be assigned a different value. As another example, a virtual address of the instance can be used as the value for the automation identifier property for the newly created instance. Similarly, a unique instance name value for an instance can be generated and passed to the accessibility framework when the instance of the user interface element is acted on. However, not all software programs may provide automation identifier values or instance name values.

A playback framework can potentially distinguish the different cancel buttons 216, 226, and 236 (or other buttons having the same class type, text string, etc.) from each other using the locations of the buttons. As illustrated, the different buttons 216, 226, and 236 are each located in different non-overlapping positions. However, in different runs of the same software build or when using different software builds, the buttons may be overlapping or the buttons may be displayed in different locations. Thus, using the locations of the buttons may not be a reliable way to identify and distinguish between the buttons.

A playback framework can potentially distinguish the different cancel buttons 216, 226, and 236 (or other buttons having the same class type, text string, etc.) from each other using the user interface paths of the buttons. For example, the button 216 can have a user interface tree property value such as "desktop/stock/cancel," the button 226 can have a user interface tree property value such as "desktop/calendar/cancel," and the button 236 can have a user interface tree property value such as "desktop/app3/cancel."

Example Record and Playback Environment

Figure 3:
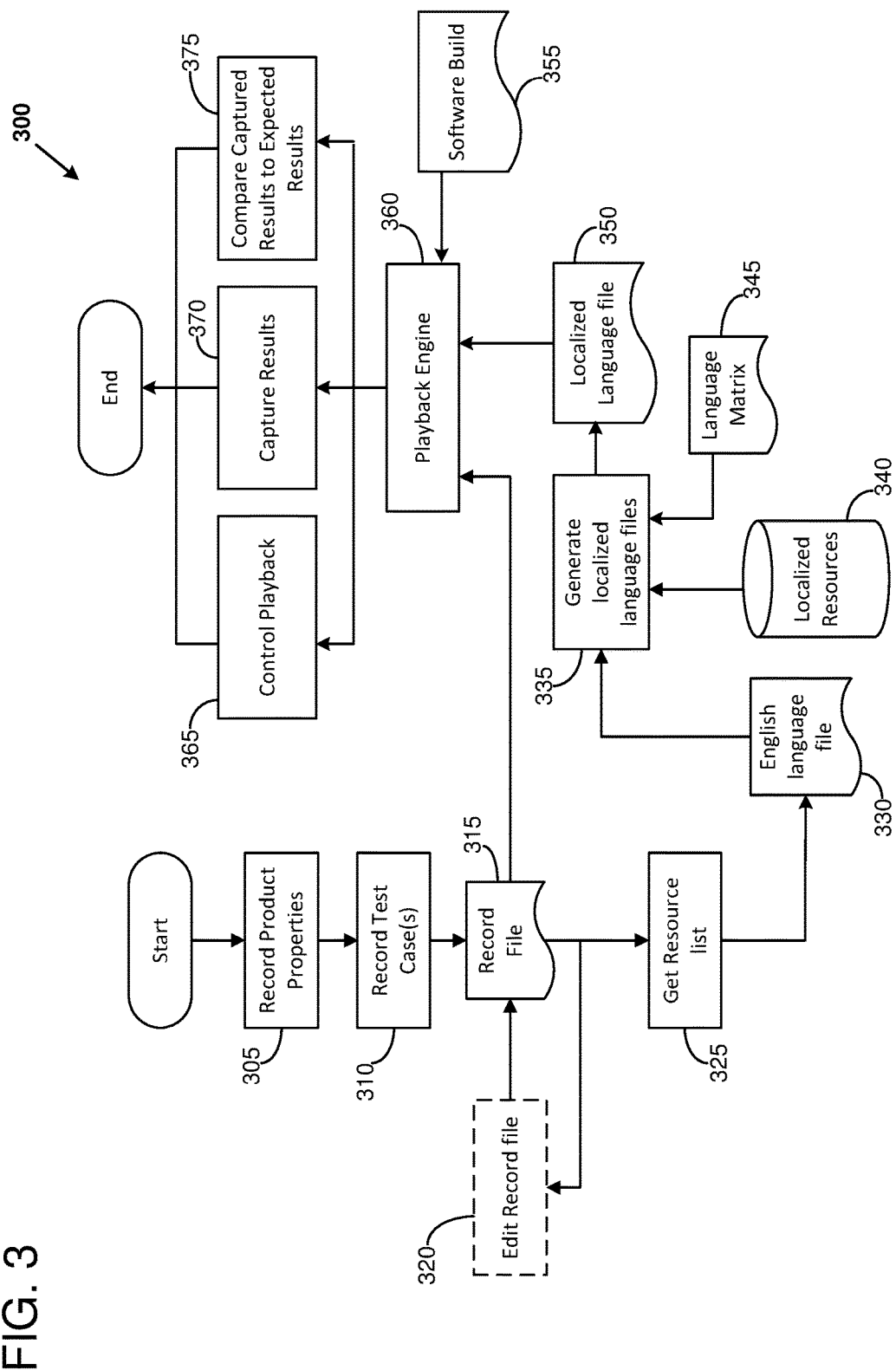
FIG. 3 shows a flow diagram of an example of recording and playing back a record file on a playback engine.

FIG. 3 shows a flow diagram of an example method 300 of recording and playing back a record file on a playback engine. As one example, the recording can be taken using a first build of a software product targeting a first language, and the playback can occur using a second build of the software product targeting a second language. At 305, software product properties can be recorded. For example, a software version number or build identifier, environment variables, a date and timestamp, and/or other information can be recorded in the record file 315 or in a separate log file.

The software product properties can be used to document which versions of the software product have been tested and can potentially be used during debugging. At 310, one or more test cases can be recorded. For example, the first build of a software product can be executed within or in communication with a recording tool. The test cases can record actions taken by a user when executing the software product within the recording tool. Specifically, the actions taken and the user interface elements acted on can be recorded. Additionally, outputs of the program can be sampled (either automatically or in response to a user operating a control of the recording tool). The recorded actions and sampled outputs can be output to the record file 315. The record file 315 can include language-specific and/or language-neutral identifiers for the user interface elements based on how the software program and the recording tool communicate. Optionally, at 320, the record file 315 can be edited by a post-processing tool and/or by a developer. As one example, the efficiency of operations recorded in the record file 315 can be increased by removing or speeding up various actions. As another example, verification points can be added or removed. As another example, the record file 315 can be processed so that language-specific identifiers are removed or modified to convert the record file 315 into a language-neutral record file.

As a specific example, the record file 315 can include actions performed on respective user interface elements of a first build of a software product targeting a first language (e.g., English). A respective user interface element can be identified in the record file 315 using one or more properties of the respective user interface element. For example, some library elements used by the software product may support user interface automation better than other library elements. As a specific example from FIG. 2, the record file 315 can include the following two statements:

```
<Action type= "left-click"> <Element className="CancelButton"
classType="button" autoID=1001 EnglishText="Cancel"
UITree="root205/Window210/Button216" /> </Action>
<Action type= "left-click"> <Element className="EventButton"
classType="button" EnglishText="Event 1"
UITree="root205/Window220/Button222" /> </Action>.
```

In the example above, the cancel button user interface element (e.g., 216 of FIG. 2) is left clicked. The cancel button user interface element can be identified with an automation identifier, a class name, a class type, an English text string, and a user identifier tree. The event button user interface element (e.g., 222 of FIG. 2) is left clicked after the cancel button (as indicated by its later position in the record file 315). The event button user interface element can be identified with a class name, a class type, an English text string, and a user identifier tree. In this example, the automation identifier property may not be supported by the event button user interface element.

At 325, a resource list can be generated from the record file 315. For example, the resource list can include a list of the user interface elements recorded in the record file 315. The user interface elements can be identified using one or more language-specific and/or language-neutral properties associated with the list of the user interface elements. The resource list can be saved in a file associated with the recording language of the test cases. For example, the resource list can be saved as an English language file 330 when the test cases are recorded in the English language and the properties used to identify the user interface elements include English-specific identifiers. Additionally or alternatively, the resource list can include a list of the user interface elements recorded in the record file 315 and language-neutral identifying properties associated with the list of the user interface elements.

Continuing with the example above, the record file 315 can be parsed and analyzed to identify the user interface elements that were acted on in the record file 315. References to the user interface elements can be stored in the English language file 330. As one example, the English language file 330 can include statements such as:

```
<Element className="CancelButton" classType="button" autoID=1001
EnglishText="Cancel" UITree="root205/Window210/Button216" />
<Element className="EventButton" classType="button"
EnglishText="Event 1" UITree="root205/Window220/Button222" />.
```

Thus, each of the references can be identified by one or more language-specific and/or language-neutral properties. For example, the class name, class type, automation identifier, and user interface tree can be language-neutral and the English text can be language-specific.

At 335, a localized language file 350 can be generated using the English language file 330, localized resources 340, and a language matrix 345. For example, the language matrix 345 can include a list of languages supported for the software product. The language matrix 345 can be arranged in a data structure that associates a respective language with files and/or information for mapping between the English language file 330 (or a language-neutral file) and the respective language. For example, the language matrix 345 can provide a reference to header files, configuration files, or other files of the code base for supporting a localized language. At 335, properties of the user interface elements in the different languages can be used to create a mapping from a recorded language or language-neutral resource list to a resource list of a localized language. As used herein, a localized or local language is a language that is supported by the software product. The language matrix 345 can include more than a hundred languages, and the process to generate 335 the localized language files can be repeated multiple times to generate a different language file for each language supported by the software program. Alternatively, the generation 335 can create a language file 350 for mapping user interface elements of multiple localized languages to the user interface elements listed in a recorded language or language-neutral resource list. Thus, a single localized language file can be used to map the recorded language to one or more of the languages listed in the language matrix 345.

Continuing with the example above, the localized language file 350 can include a data structure for mapping a user interface element of the software build used to generate the record file 315 to a user interface element of the second software build 355 used for playback. It should be noted that the user interface elements of the different software builds can refer to the same class in the code base, such as when the class for the user interface elements is capable of supporting multiple languages. Alternatively, the user interface elements of the different software builds can refer to different classes in the code base, such as when each class for the user interface elements supports less than all of the languages listed in the language matrix 345. As a specific example where the user interface element class can support multiple languages, the localized language file 350 can include statements such as:

```
<Map> <RecordElement className="CancelButton" classType="button"
autoID=1001 EnglishText="Cancel" UITree=
"root205/Window210/Button216" /> <PlayBackElement
className="CancelButton" classType="button" autoID=1001
GermanText="abbrechen" UITree= "root205/Window210/Button216" />
</Map>
<Map> < RecordElement className="EventButton" classType="button"
EnglishText="Event 1" UITree="root205/Window220/Button222" />
<PlayBackElement className="EventButton" classType="button"
GermanText="Kalenderereignis 1"
UITree="root205/Window220/Button222"
/> </Map>.
```

The playback engine 360 can play the record file 315 that was recorded in one language on a software build 355 that is executing in a different language. Specifically, the playback engine 360 can execute (e.g., perform instructions for, interface with) the software build 355 by performing actions specified in the record file 315 on user interface elements of the software build 355. The playback engine 360 can use the localized language file 350 to translate between the user interface elements specified in the record file 315 and the user interface elements of the software build 355. Specifically, the playback engine 360 can use a hierarchical search of the properties provided by the localized language file 350. An example of a hierarchical search is described in reference to FIG. 4 further below. Generally, the playback engine 360 can control playback 365 of the record file 315, capture results 370 from the executing software build 355, and compare 375 the captured results to expected results (such as at a verification point captured in the record file 315).

Example Hierarchical Search

Figure 4:
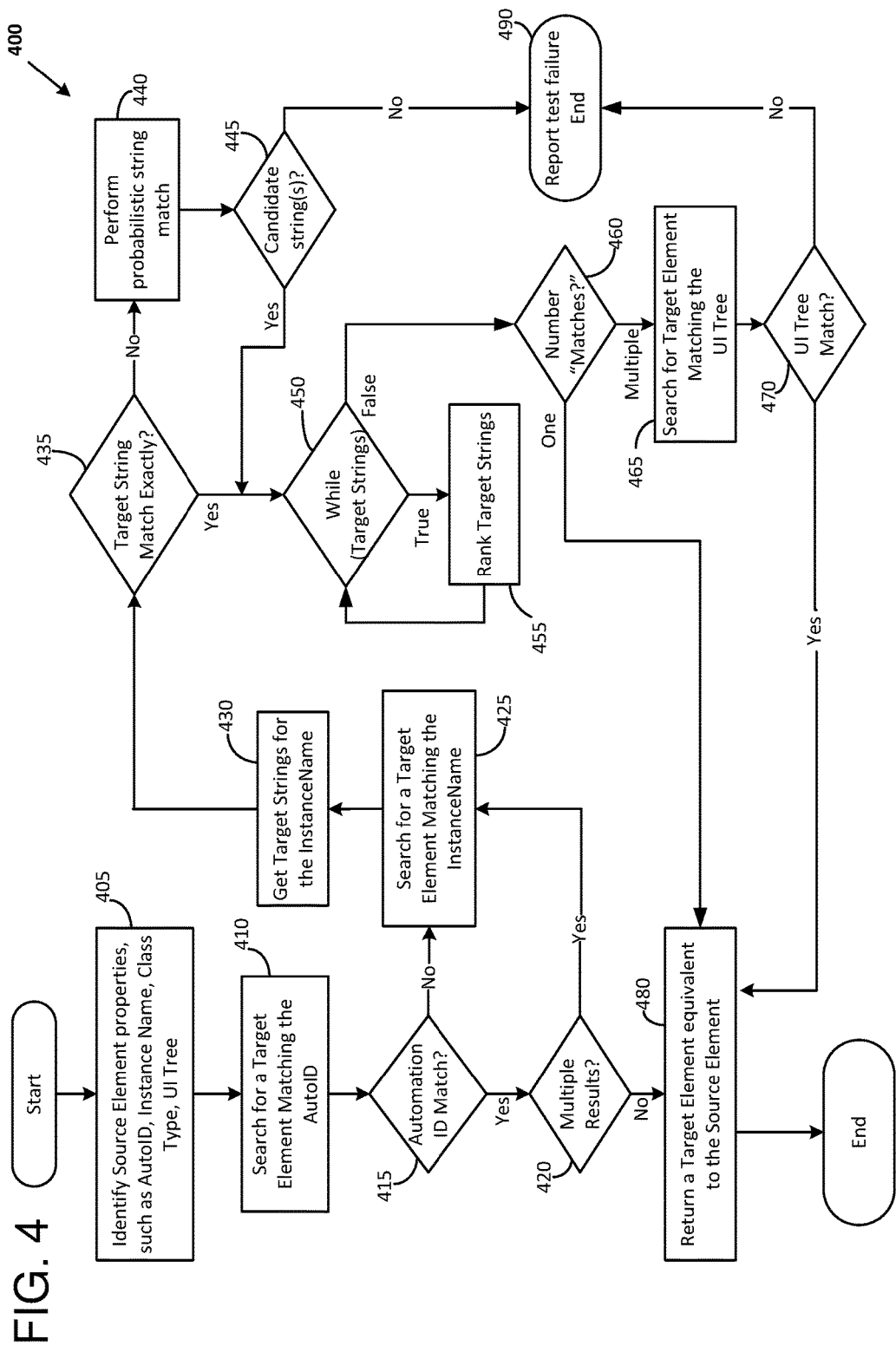
FIG. 4 illustrates a flow diagram of an example of performing a hierarchical search of the properties provided by a localized language file.

FIG. 4 illustrates a flow diagram of an example method 400 of performing a hierarchical search of the properties provided by the localized language file. In particular, the method 400 can be used to find equivalencies between a user interface element specified in a record file and a user interface element of a software build that is different than the software build used to generate the record file. Generally, the method 400 can identify properties of a source element, where the source element is a user interface element referenced in the record file. The source element properties can be used to hierarchically search the localized language file to potentially identify an equivalent target element that performs the same function as the source element. The target element is a user interface element of the software build being executed. If no equivalent element is found, the hierarchical search fails and the playback is likely to fail. However, if an equivalent element is found, an action from the record file can be performed on (e.g., applied to) the target element, or additional verification can be performed if the source and target elements are associated with a verification point.

At 405, source element properties can be identified. In particular, a source element can be selected from a statement of the record file and properties of the source element can be identified from the record file and/or the localized language file. The properties can be language-specific or language-neutral properties. The properties can include an automation identifier (AutoID), an instance name, a class type, a user interface tree (UI Tree), or other various properties.

The hierarchical search can proceed in stages, where each stage can result in no matches, one match, or multiple matches. If only one match is found in a given stage, the hierarchical search can end successfully. However, if no or multiple matches are found the hierarchical search can continue until the hierarchical search finds a single match or runs out of properties to search. The search will end in failure if a single match cannot be found for at least one of the properties.

At 410, the localized language file can be searched for a target element having an automation identifier property value matching an automation identifier property value of the source element. At 415, it can be determined if a matching target element was found. If no matches are found or if the source element does not have an automation identifier property value, the hierarchical search can transition to the next stage, beginning at 425. If at least one match is found, at 420, it can be determined if multiple matches are found. If only one match is found, the hierarchical search can return the equivalent target element at 480 and then end successfully. However, if multiple matches are found, the hierarchical search can transition to the next stage, beginning at 425. When multiple matches are found, the set of target elements can be reduced for the next stage of the hierarchical search. In particular, only the target elements with a matching automation identifier can be searched in the next stage, which can potentially save power and/or increase processing speed for the search.

At 425, the next stage of the hierarchical search can begin. As one example, the localized language file can be searched for target elements having an instance name or other text string that at least partially matches an instance name or other text string of the source element. The target elements having at least a partially matching text string can be collected at 430. At 435, it can be determined if a target element with an exactly matching text string is found. If an exact match is found, the hierarchical search can continue at 450. Otherwise the hierarchical search can continue at 440, where a probabilistic string match can be performed.

The probabilistic string match 440 can assign a score to a target element based on a probability that a target text string matches a source text string. As one example, the probabilistic string match 440 can assign points based on a length of common sub-string matches between the target text string and the source text string. The length of the common sub-string matches can be divided by a length of the source text string. Thus, a greater common sub-string match can generate a larger score indicating a higher probability of a match. As a specific example, "stocks—market open" can be compared to "stock—market closed." When the spaces are included, the common sub-string "stocks—market" has a length of 16 and the source string has a length of 20. Thus, a score of 16/20 or 0.8 can be assigned to the target string "stock—market closed." The calculated score for each of the target strings can be compared to a threshold value (such as 0.5) and each target string exceeding the threshold value can be classified as a candidate string. At 445, it can be determined if there are any candidate strings. If there are no candidate strings, the search can end unsuccessfully at 490 and an error value can be returned. However, if there is at least one candidate string, the method 400 can continue at 450.

At 450 and 455, the target strings can be ranked or ordered so that more probable matches can be distinguished from less probable matches. At 460, it can be determined how many target strings match the most probable score. If only one target string has the most probable score, the hierarchical search can return the equivalent target element at 480 and then end successfully. However, if multiple target strings have the most probable score, the hierarchical search can transition to the next stage, beginning at 465.

At 465, the localized language file can be searched for target elements having a user interface tree property that matches a user interface tree property of the source element. In one embodiment, the user interface tree property can be language-neutral, such as when the user interface elements are assigned a numeric or alphanumeric value that is language independent. In this case, at 470, it can be determined if an exact match is found for the user interface tree property. If one exact match is found, the hierarchical search can return the equivalent target element at 480 and then end successfully. However, if no or multiple matches are found, the hierarchical search can report a failing condition and end at 490. In an alternative embodiment, the user interface tree property can be language-specific, such as when the user interface elements are assigned a value based on a text string displayed by the user interface element. In this case, a probabilistic string match of the user interface path can be performed similar to that described at 435-460.

The ordering of stages in the example method 400 can be changed to reflect a different ranking or priority of property types. For example, the search for target elements having a matching user interface tree property (at 465) can precede the search for a target element matching an instance name or other text string (at 425).

Example Playback Methods

Figure 5A:
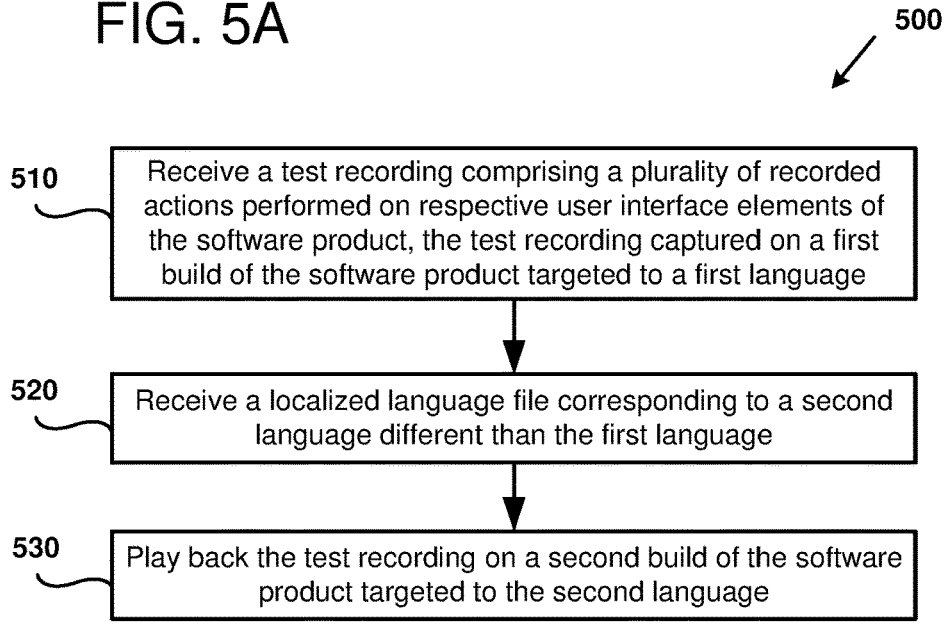
FIG. 5A illustrates an example method of testing a user interface of a software product.

FIG. 5A illustrates an example method 500 of testing a user interface of a software product capable of supporting multiple languages. At 510, a test recording can be received. The test recording can include a plurality of recorded actions performed on respective user interface elements of the software product. For example, the test recording can include one or more statements, where a respective statement can specify an action to perform on a given user interface element. The test recording can be captured on a first build of the software product targeted to a first language. As one example, the test recording can specify properties of the user interface elements of the first build of the software product using language-specific properties, such as a text string in the first language. As another example, the test recording can specify properties of the user interface elements of the first build of the software product using language-neutral properties, such as an automation identifier. The test recording can also include information about the software build used for the recording, timing information between actions, and verification points indicating outputs to test.

At 520, a localized language file can be received. The localized language file can correspond to a second language different than the first language. The localized language file can associate the recorded user interface elements with multiple properties. For example, the recorded user interface elements can be associated with one or more properties of the user interface elements of a second build of the software product targeted to the second language. As a specific example, the localized language file can include a data structure that maps one or more properties of a given recorded user interface element to properties of a user interface element of the second build that performs the same or a similar function when the second build is executing.

At 530, the test recording can be played back on the second build of the software product targeted to the second language. As one example, the second build of the software product can be executed on a virtual machine, and the actions specified by the test recording can be applied as inputs to the software product as it is executed. As another example, the second build of the software product can be executed or interpreted within an IDE, and the actions specified by the test recording can be applied as stimulus to the software product being interpreted by the IDE. As another example, the second build of the software product can be executed concurrently and in communication with an accessibility framework. The test recording can be applied as an input to the accessibility framework which can generate input stimulus to the software product. Playing back the test recording can include stepping through the statements of the test recording and, for each statement, either performing an action specified by the statement or verifying that an output of the second build is equivalent to an output of the first build as specified by the statement. Performing an action specified by the statement can include finding a user interface element of the second build that performs the same or a similar function as a user interface element of the first build.

Figure 5B:
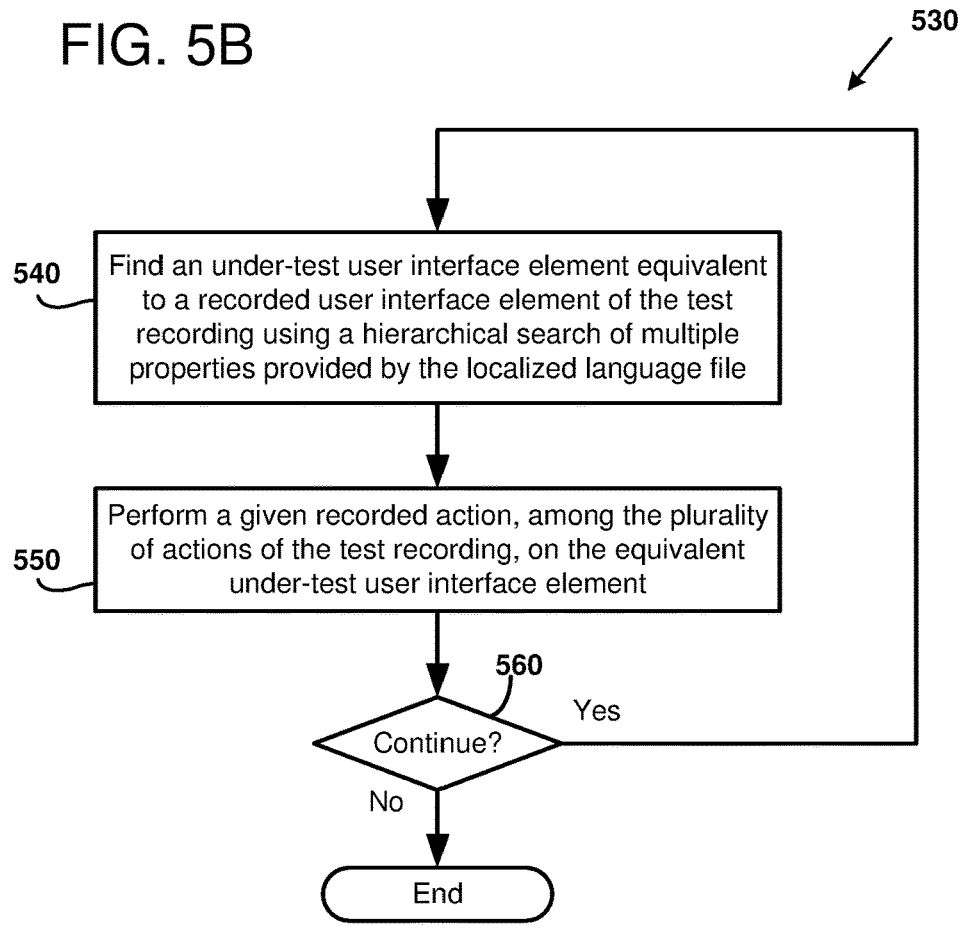
FIG. 5B illustrates an example of actions occurring during playback of a record file.

FIG. 5B illustrates an example of actions occurring during playback 530 of the test recording. For example, as part of the playback 530, at 540, an under-test user interface element (e.g., a user interface element of the second build) equivalent to a recorded user interface element of the test recording can be found using a hierarchical search of the multiple properties provided by the localized language file. For example, the hierarchical search can include multiple stages where a different property is searched during each stage. As a specific example, a first stage of the hierarchical search can include searching for an under-test user interface element that has an automation identifier matching an automation identifier of the recorded user interface element. If a single user interface element is identified in the first stage, the search can end. However, if multiple or no user interface elements are identified in the first stage, the hierarchical search can continue at a second stage. When multiple interface elements are identified in earlier stages, the set of items searched in the localized language file can be reduced to only the items identified earlier in the search. Thus, later stages of the search may use less processing power than earlier stages of the search, potentially saving power and/or increasing processing speed. The next stage of the hierarchical search can include searching for an under-test user interface element in the localized language file that has a text string that exactly or partially matches a text string of the recorded user interface element. If a single user interface element is identified, the search can end. However, if multiple interface elements are identified, the under-test user interface element(s) most closely matching the recorded user interface elements can be identified and ranked based on a closeness of the match. If one under-test user interface element most closely matches the recorded user interface element, the search can end. However, if multiple or no user interface elements are identified in the second stage, the hierarchical search can continue at a third stage. The next stage of the hierarchical search can include searching for an under-test user interface element in the localized language file that has a user interface tree that matches a user interface tree of the recorded user interface element. In this manner, multiple properties of the user interface elements can be used to potentially identify user interface elements from different software builds that perform the same or a similar function. Using multiple properties and a probabilistic string match can potentially increase the likelihood of finding an under-test user interface element that is equivalent to the recorded user interface element.

As part of the playback 530, at 550, a given recorded action, from among the recorded actions of the test recording, can be performed on the equivalent under-test user interface element. For example, the action can be equivalent to clicking a mouse button, moving a cursor, entering text, or performing other input activities. As another example, the action can be to verify output that is presented or a change in the output of the software program. In particular, it can be verified if a value of a user interface element is displayed as specified, if a user interface element (such as a window) appears or is removed, and so forth. In this manner, a test recording captured on one software build targeted to a first language can be used by a playback framework to programmatically test for equivalent functionality on a software build targeted to a second language. Using a hierarchical search of multiple properties of the user interface elements and a probabilistic string match can potentially increase the reliability of the playback of the test recording across different software builds.

As part of the playback 530, at 560, it can be determined whether the playback will continue. Playing back the test recording can include stepping through the statements of the test recording. Generally, the playback 530 can continue while there are statements of the test recording that remain to be played back. However, the playback 530 can be stopped before the end of the test recording for various reasons, such as when an action specified by a statement of the test recording cannot be performed. In particular, if an under-test user interface element equivalent to a recorded user interface element cannot be found, the playback 530 can report a test failure and end. As another example, the test recording can include statements for verifying that an output of the second build is equivalent to an output of the first build. If it is detected that the outputs do not match, the playback 530 can report a test failure and end. Additionally, the playback 530 can end when there are no more statements of the test recording to be played back.

Figure 6:
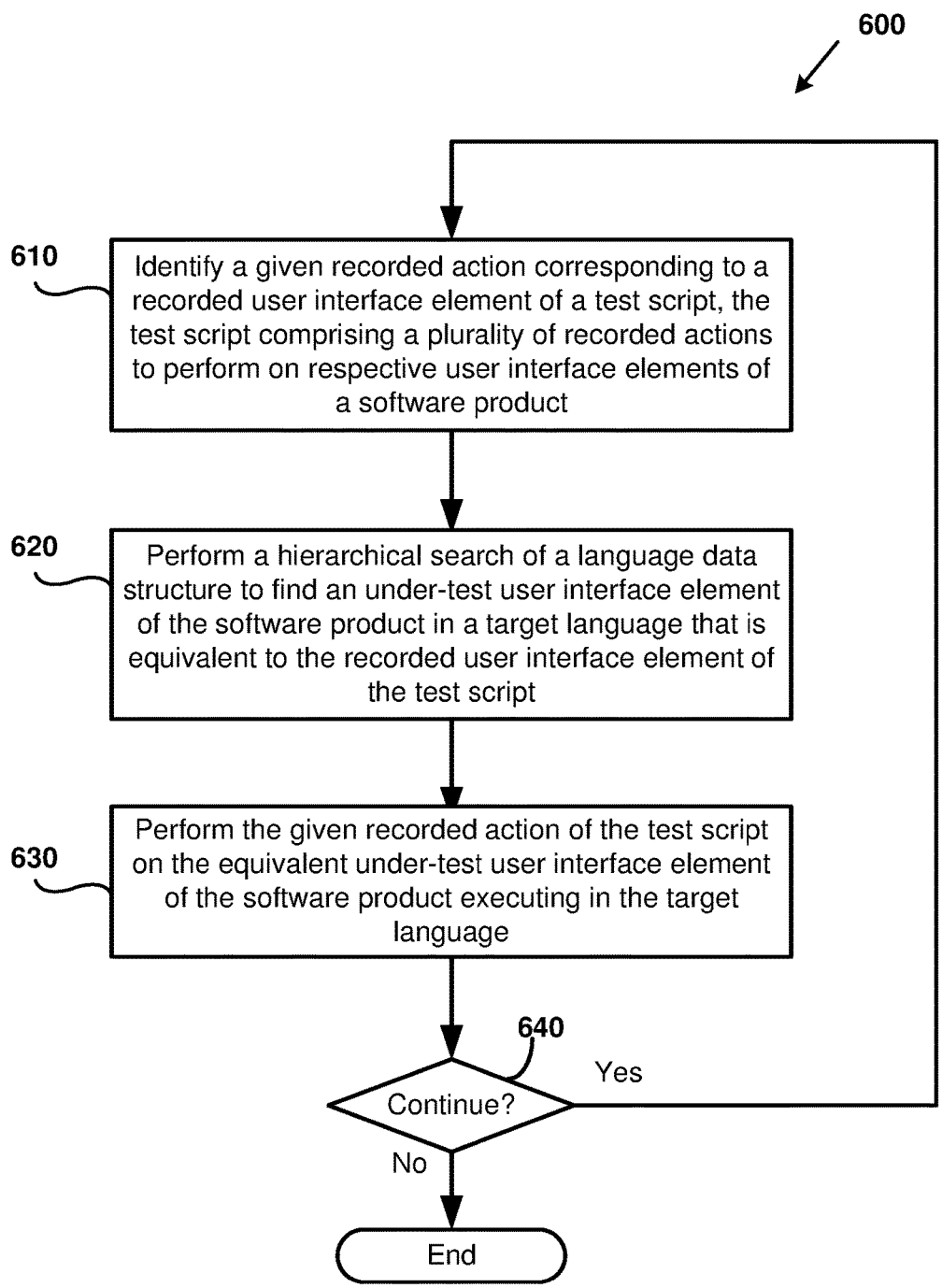
FIG. 6 illustrates an example method of executing a build of a software product in a target language.

FIG. 6 illustrates an example method 600 of executing a software product in a target language. The software product can be capable of supporting multiple languages. The multi-language support can be provided by using different builds of the software product (e.g., using different software modules corresponding to different respective languages, where the different software modules are selected from a code base of the software product), using different configuration files and/or environment variables to specify which language to use, or various other methods for choosing a language for the software product. The software product can be executed by a software processor (e.g., a virtual machine or an interpreter) or by a hardware processor.

At 610, a given recorded action corresponding to a recorded user interface element of a test script (from a recording file) can be identified. The test script can include a plurality of recorded actions to perform on respective user interface elements of the software product. As one example, the test script can be based on results captured from executing the software product in a first language that is the same or different from the target language. As a specific example, the inputs and the outputs of the software product can be captured by an accessibility framework and recorded in the test script. The test script can be edited or post-processed, such as by removing, adding, or modifying actions. It can be desirable to post process the test script to reduce a runtime of the test script and/or to add capabilities to the test script, such as interfacing with a playback environment. Additionally or alternatively, the test script can be programmed by a developer. For example, the developer can write code for the test script using a programming language of the playback environment.

At 620, a hierarchical search of the language data structure can be performed. For example, the language data structure can identify properties associated with user interface elements in a target language supported by the software product. In particular, the language data structure can map one or more properties of a user interface element in the test script to one or more properties of an under-test user interface element of the software product in the target language. The mapping can identify user interface elements with the same or similar functionalities. The hierarchical search can be used to find an under-test user interface element of the software product in the target language that is equivalent to the recorded user interface element of the test script. The hierarchical search can be organized based on property types of the user interface elements of the language data structure. For example, the different property types can be searched in a predefined order. As a specific example, an automation identifier can be searched prior to a text string property. The text string property can be searched for exact matches and partial matches. The text string property can be searched prior to a user interface tree property. Thus, multiple property values can be used to perform the hierarchical search to find the under-test user interface element that is most closely equivalent to the recorded user interface element in the test script.

At 630, the given recorded action of the test script can be performed on the equivalent under-test user interface element of the software product executing in the target language. The recorded action can include causing the under-test user interface element to perform a function or verifying that an output of the under-test user interface element matches an expected output, for example.

At 640, it can be determined whether to continue executing the software product. For example, if there are more actions from the test script to perform on respective user interface elements of the software product, the execution can continue at 610. However, if there are no more actions from the test script to perform on respective user interface elements of the software product, the execution can end. In this manner, a test script directed to a software product using one language can be executed on the software product using a different language.

Additional Examples of the Disclosed Technology

Additional examples of the disclosed subject matter are discussed herein in accordance with the examples discussed above.

In one embodiment, a method can be used to test a user interface of a software product. The method includes receiving a test recording comprising a plurality of recorded actions performed on respective user interface elements of the software product. The test recording is captured on a first build of the software product targeted to a first language. The method includes receiving a localized language file corresponding to a second language different than the first language. The localized language file associates the user interface elements with multiple properties. The method includes playing back the test recording on a second build of the software product targeted to the second language. The playing back includes finding an equivalent under-test user interface element to a recorded user interface element of the test recording using a hierarchical search of the multiple properties provided by the localized language file. The playing back includes performing a given recorded action, among the plurality of recorded actions of the test recording, on the equivalent under-test user interface element.

The hierarchical search of the multiple properties can include searching for properties corresponding to an automation identifier, a text string, and a path identifier. For example, the hierarchical search of the multiple properties can include searching for an automation identifier property prior to searching for a text string. As another example, the hierarchical search of the multiple properties can include searching for a text string prior to searching for a path identifier. As another example, the hierarchical search of the multiple properties can include performing a probabilistic search of a text string. The hierarchical search of the multiple properties can complete when a property of the under-test user interface element matches a property provided by the localized language file corresponding to a single recorded user interface element of the test recording.

The test recording can be language neutral and the localized language file can map language-neutral user interface elements to user interface elements associated with the second language. Alternatively, the test recording can be in the first language and the localized language file can map user interface elements associated with the first language to user interface elements associated with the second language.

In another embodiment, one or more computer-readable media can be used for storing computer-executable instructions, which when executed by a computer, cause the computer to perform operations. The operations include receiving a language-neutral script comprising a plurality of recorded actions to perform on respective user interface elements of a software product supporting multiple languages. The operations include receiving a language file mapping properties of the respective user interface elements of the language-neutral script to properties of user interface elements in a target language among the multiple languages supported by the software product. The operations include executing the language-neutral script on a playback engine interfacing with a build of the software product in the target language. Executing the language-neutral script on the playback engine includes identifying, among the plurality of actions of the language-neutral script, a given recorded action corresponding to a recorded user interface element of the language-neutral script. Executing the language-neutral script on the playback engine includes finding an equivalent under-test user interface element of the build of the software product in the target language to the recorded user interface element of the language-neutral script by performing an ordered search of property types of the properties mapped in the language file. Executing the language-neutral script on the playback engine includes performing the given recorded action of the language-neutral script to the equivalent under-test user interface element of the build of the software product in the target language.

The ordered search of property types can include searching for values matching an automation identifier property before searching for values matching other properties. The ordered search of property types can include searching for matching substrings of a text string. The ordered search of property types can include ranking user interface elements of the build of the software product based on a length of a matching substring of a text string of the respective user interface elements. The ordered search of property types can include searching for a matching user interface tree property. The ordered search of property types can include searching for a matching automation identifier prior to searching for a text string prior to searching for a user interface tree property.

In another embodiment, a computer system comprises a computer readable storage medium and a processor in communication with the computer readable storage medium. The computer readable storage medium includes a test script comprising a plurality of recorded actions to perform on respective user interface elements of a build of a software product supporting multiple languages. The test script is based on captured results of executing the software product in a first language. The computer readable storage medium includes a language data structure identifying properties associated with user interface elements in a target language supported by the software product, where the target language is different than the first language. The processor is configured to execute the build of the software product in the target language. The processor is configured to identify, among the plurality of actions of the test script, a given recorded action corresponding to a first user interface element of the test script. The processor is configured to perform a hierarchical search of the language data structure to find an equivalent under-test user interface element of the build of the software product in the target language to the recorded user interface element of the test script. The hierarchical search is organized based on property types of the user interface elements of the language data structure. The processor is configured to perform the given recorded action of the test script to the equivalent under-test user interface element of the build of the software product in the target language.

Performing the hierarchical search of the language data structure can include using properties of the equivalent under-test user interface element to find the corresponding recorded user interface element. Performing the hierarchical search of the language data structure can include searching properties corresponding to an automation identifier, a text string, and a user interface path identifier. Performing the hierarchical search of the language data structure can include searching the automation identifier before the text string. Performing the hierarchical search of the language data structure comprises searching the text string before the user interface path identifier. Searching the text string can include using a probabilistic string match.

Example Computing Environment

Figure 7:
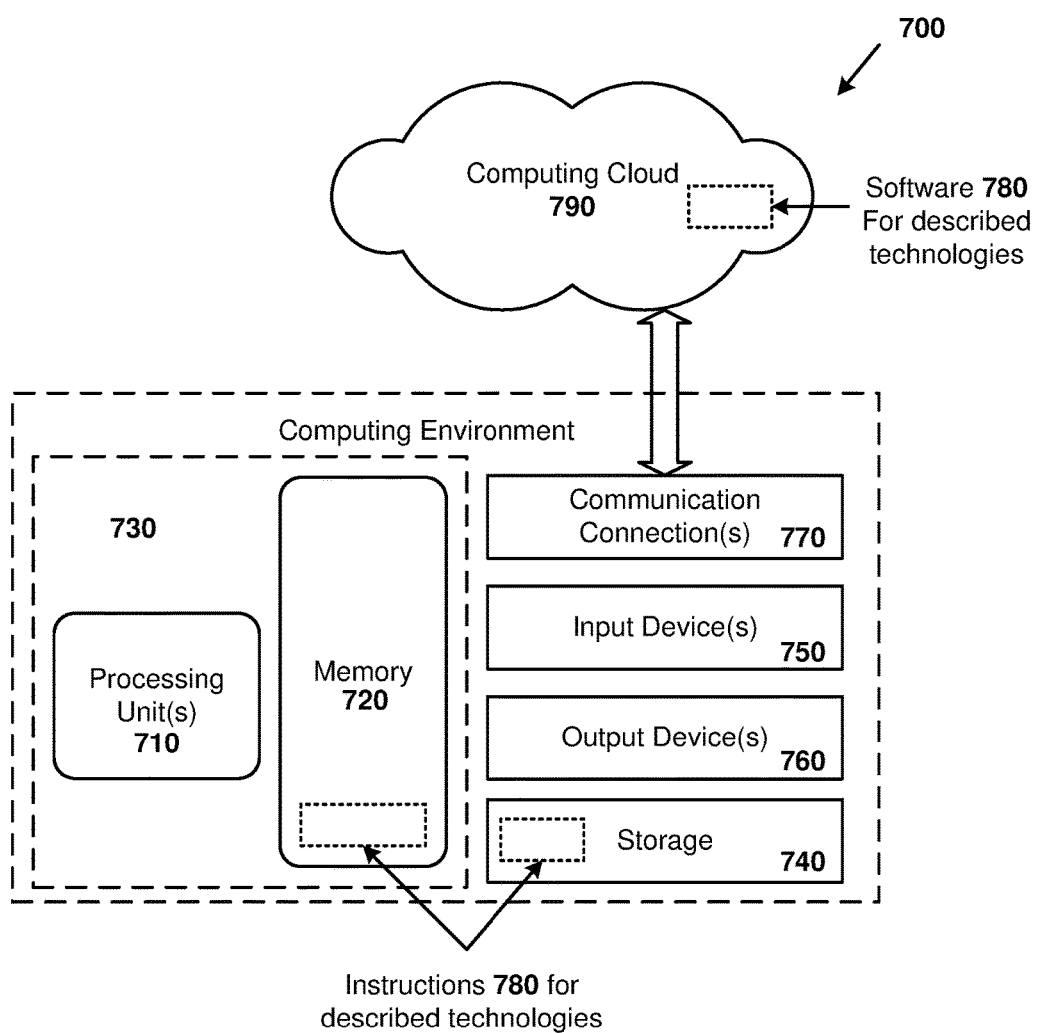
FIG. 7 is a block diagram illustrating a suitable computing environment for implementing some embodiments of the disclosed technology.

FIG. 7 illustrates a generalized example of a suitable computing environment 700 in which described embodiments, techniques, and technologies, including supporting a multi-language playback framework, can be implemented.

The computing environment 700 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power and as such, multiple processors can be running simultaneously. The memory 720 may be volatile memory (e.g., registers, cache, RAM), non-volatile memory (e.g., ROM, EEPROM, flash memory, etc.), or some combination of the two. The memory 720 stores software 780, images, and video that can, for example, implement the technologies described herein. A computing environment may have additional features. For example, the computing environment 700 includes storage 740, one or more input devices 750, one or more output devices 760, and one or more communication connections 770. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and that can be accessed within the computing environment 700. The storage 740 stores instructions for the software 780, plugin data, and messages, which can be used to implement technologies described herein.

The input device(s) 750 may be a touch input device, such as a keyboard, keypad, mouse, touch screen display, pen, or trackball, a voice input device, a scanning device, or another device, that provides input to the computing environment 700. For audio, the input device(s) 750 may be a sound card or similar device that accepts audio input in analog or digital form, or a CD-ROM reader that provides audio samples to the computing environment 700. The output device(s) 760 may be a display, printer, speaker, CD-writer, or another device that provides output from the computing environment 700.

The communication connection(s) 770 enable communication over a communication medium (e.g., a connecting network) to another computing entity. The communication medium conveys information such as computer-executable instructions, compressed graphics information, video, or other data in a modulated data signal. The communication connection(s) 770 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 790. For example, the disclosed methods can be executed on processing units 710 located in the computing environment 730, or the disclosed methods can be executed on servers located in the computing cloud 790.

Computer-readable media are any available media that can be accessed within a computing environment 700. By way of example, and not limitation, with the computing environment 700, computer-readable media include memory 720 and/or storage 740. As should be readily understood, the term computer-readable storage media includes the media for data storage such as memory 720 and storage 740, and not transmission media such as modulated data signals.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. One or more computer-readable storage media storing computer-executable instructions, which when executed by a computer, cause the computer to perform operations, the operations comprising:
   receiving a language-neutral script comprising a plurality of recorded actions to perform on respective user interface elements of a software product supporting multiple languages;
   receiving a language file mapping properties of the respective user interface elements of the language-neutral script to properties of user interface elements in a target language among the multiple languages supported by the software product; and
   executing the language-neutral script on a playback engine interfacing with a build of the software product in the target language, wherein executing the language-neutral script on the playback engine comprises:
     identifying, among the plurality of recorded actions of the language-neutral script, a given recorded action corresponding to a recorded user interface element of the language-neutral script, the recorded user interface element comprising a plurality of properties, wherein each property of the plurality of properties is a different property type;
     finding an under-test user interface element of the build of the software product in the target language equivalent to the recorded user interface element of the language-neutral script by performing an ordered search for the properties of the recorded user interface element within the language file, the ordered search evaluating the properties of the recorded user interface element in a predefined order that prioritizes the different property types relative to each other; and
     performing the given recorded action of the language-neutral script on the matching under-test user interface element of the build of the software product in the target language.

2. The one or more computer-readable storage media of claim 1, wherein the ordered search comprises searching for values matching an automation identifier property before searching for values matching other properties.

3. The one or more computer-readable storage media of claim 1, wherein the ordered search comprises searching for matching substrings of a text string.

4. The one or more computer-readable storage media of claim 3, wherein the ordered search comprises ranking user interface elements of the build of the software product based on a length of a matching substring of a text string of the recorded user interface element of the language-neutral script.

5. The one or more computer-readable storage media of claim 1, wherein the ordered search comprises searching for a matching user interface tree property.

6. The one or more computer-readable storage media of claim 1, wherein the ordered search comprises searching for a matching automation identifier prior to searching for a text string prior to searching for a user interface tree property.

7. A method of testing a user interface of a software product, the method comprising:
receiving a test recording comprising a plurality of recorded actions performed on respective user interface elements of the software product, the test recording captured on a first build of the software product targeted to a first language;
receiving a localized language file corresponding to a second language different than the first language, the localized language file associating the respective user interface elements with multiple properties, wherein each of the multiple properties associated with the respective user interface elements has a property type; and
playing back the test recording on a second build of the software product targeted to the second language, wherein the playing back comprises:
 finding an equivalent under-test user interface element to a recorded user interface element of the test recording using a hierarchical search of the multiple properties provided by the localized language file, the hierarchical search evaluating properties of the recorded user interface element in a predefined order that prioritizes the different property types relative to each other; and
 performing a given recorded action, among the plurality of recorded actions of the test recording, on the equivalent under-test user interface element.

8. The method of claim 7, wherein the hierarchical search of the multiple properties comprises searching for properties corresponding to an automation identifier, a text string, and a path identifier.

9. The method of claim 7, wherein the hierarchical search of the multiple properties comprises searching for an automation identifier property prior to searching for a text string.

10. The method of claim 7, wherein the hierarchical search of the multiple properties comprises searching for a text string prior to searching for a path identifier.

11. The method of claim 7, wherein the hierarchical search of the multiple properties comprises performing a probabilistic search of a text string.

12. The method of claim 7, wherein the test recording is language neutral and the localized language file maps language-neutral user interface elements to user interface elements associated with the second language.

13. The method of claim 7, wherein the test recording is in the first language and the localized language file maps user interface elements associated with the first language to user interface elements associated with the second language.

14. The method of claim 7, wherein the hierarchical search of the multiple properties completes when a property of the under-test user interface element matches a property provided by the localized language file corresponding to the recorded user interface element of the test recording.

15. A computing system comprising:
a computer readable storage medium comprising:
 a test script comprising a plurality of recorded actions to perform on respective user interface elements of a software product supporting multiple languages, the test script based on captured results of executing a build of the software product in a first language; and
 a language data structure identifying properties associated with user interface elements in a target language supported by the software product, the target language different than the first language; and
a hardware processor in communication with the computer readable storage medium, the processor configured to:
 execute a build of the software product in the target language;
 identify, among the plurality of recorded actions of the test script, a given recorded action corresponding to a recorded user interface element of the test script, the recorded user interface element comprising a plurality of properties, each of the properties being a different property type;
 perform a hierarchical search of the language data structure to find an equivalent under-test user interface element of the build of the software product in the target language to the recorded user interface element of the test script, the hierarchical search organized based on property types of the user interface elements of the language data structure, whereby the hierarchical search evaluates the properties of the recorded user interface element in a predefined order that prioritizes the different property types relative to each other; and
 perform the given recorded action of the test script on the equivalent under-test user interface element of the build of the software product in the target language.

16. The computing system of claim 15, wherein performing the hierarchical search of the language data structure comprises using properties of the equivalent under-test user interface element to find the corresponding recorded user interface element.

17. The computing system of claim 15, wherein performing the hierarchical search of the language data structure comprises searching properties corresponding to an automation identifier, a text string, and a user interface path identifier.

18. The computing system of claim 17, wherein performing the hierarchical search of the language data structure comprises searching the automation identifier before the text string.

19. The computing system of claim 18, wherein performing the hierarchical search of the language data structure comprises searching the text string before the user interface path identifier.

20. The computing system of claim 18, wherein searching the text string comprises using a probabilistic string match.

* * * * *